Nov. 2, 1954 C. L. SELEE 2,693,509

AUXILIARY TELEPHONE CRADLE

Filed May 15, 1951 2 Sheets-Sheet 1

INVENTOR
CHARLES L. SELEE.

BY
Curtis, Morris & Safford.
ATTORNEYS:

Nov. 2, 1954

C. L. SELEE 2,693,509

AUXILIARY TELEPHONE CRADLE

Filed May 15, 1951

2 Sheets-Sheet 2

INVENTOR:
CHARLES L. SELEE

BY
Curtis, Morris & Safford.
ATTORNEYS:

United States Patent Office 2,693,509

Patented Nov. 2, 1954

2,693,509

AUXILIARY TELEPHONE CRADLE

Charles L. Selee, New York, N. Y.

Application May 15, 1951, Serial No. 226,459

1 Claim. (Cl. 179—146)

This invention relates to telephones, and more particularly to a cradle or holder adapted to support the receiver without breaking the telephone circuit.

In using a telephone of the "hand set" type wherein the receiver and transmitter are both contained in a hand piece, it is often desirable to put the receiver down temporarily during a conversation and frequently there is no convenient or safe space available.

It is accordingly a primary object of this invention to provide a safe and convenient auxiliary cradle for holding the receiver without breaking the circuit. Another object is to provide a cradle that is easily and readily detachable. A further object is to provide a resilient cradle mounting that will protect the receiver from jarring or dropping. It is still a further object to provide a cradle that is simple and inexpensive to manufacture. Other and further objects will be in part obvious and in part pointed out below:

Figure 1:
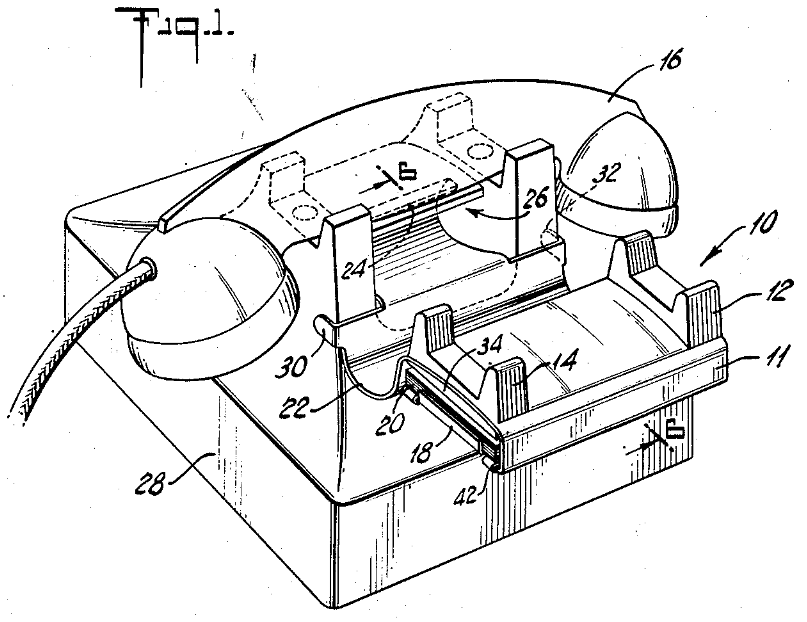
Figure 1 is a perspective view of a cradle according to the present invention attached to a telephone of the "hand set" type.

Referring to Figure 1, a telephone apparatus comprising a hand piece 16 containing the receiver and transmitter and a base portion 7 containing a bell, dialing and ringing circuits, has formed thereon a cradle portion 8 and circuit interrupting pins 9. Also mounted thereon is an auxiliary cradle structure 10. This auxiliary cradle structure comprises a hollow chamber portion 11 having mounted thereon two pairs of upstanding ears 12 and 14 positioned so as to form a cradle for holding the telephone receiver 16. Extending from one side of the chamber 11 is a resilient channel portion 22 (Figure 6) formed as an integral portion of said chamber and joining it to a curved ear 24 (see Figure 2). Curved ear 24 is turned back on itself so as to engage the lip of the recess 26 in the telephone stand 28 whereby said cradle assembly is detachably mounted on the telephone stand. A pair of ears 30 and 32 are provided at the ends of the upper edge of the resilient channel 22 to align the cradle assembly with the stand.

By providing the resilient channel portion, applicant not only provides a convenient tray for pencils or the like but more importantly provides a cushioning effect to protect the receiver from excessive jarring when laid aside. This also will reduce the noise in the ear of the listener when the receiver is put down during a conversation. At the same time this channel spaces the receiver from the stand so that the receiver cannot touch or be banged against the stand with the attendant noises induced in the telephone circuit.

Figure 2:
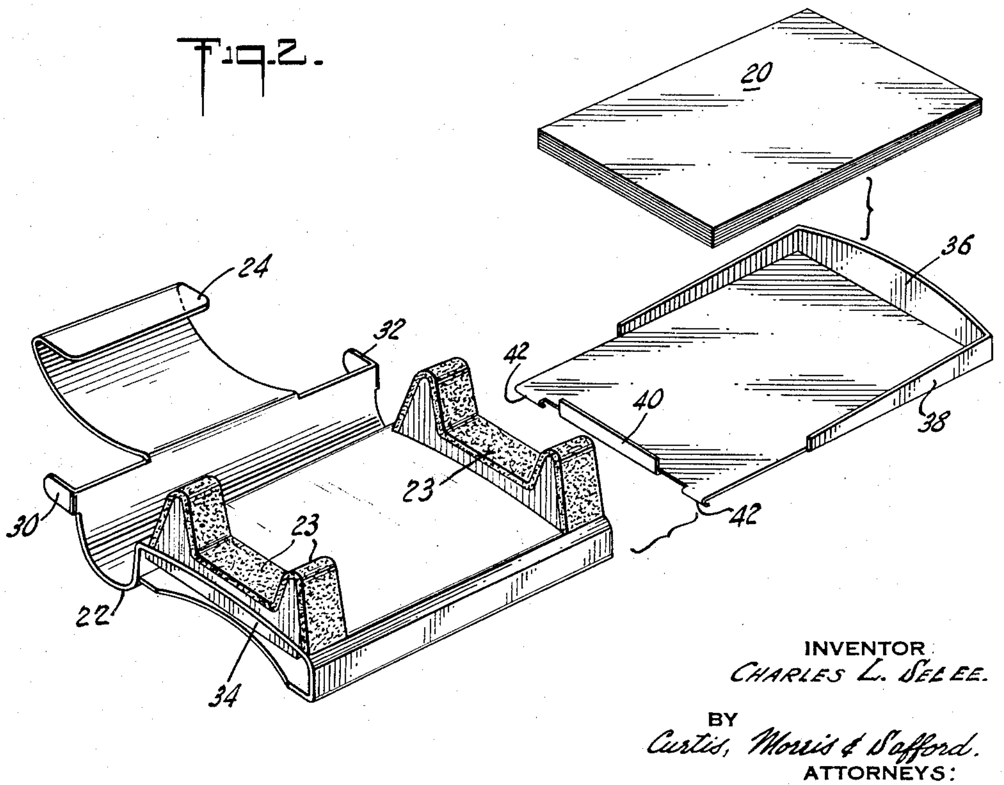
Figure 2 is an exploded perspective view of the cradle and a sliding tray carried in the cradle.
Figures 3, 4, 5, 6:
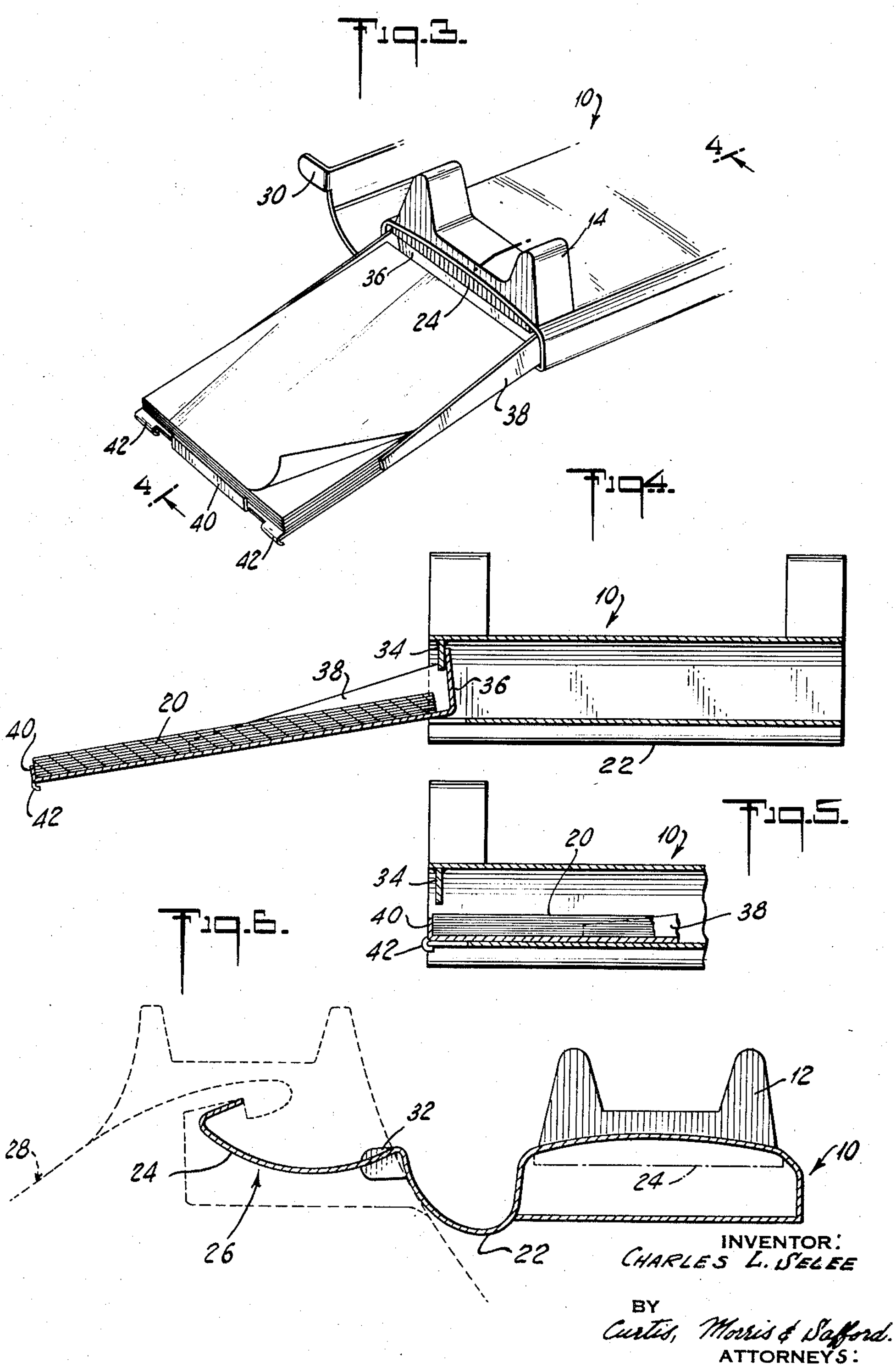
Figure 3 is a perspective fragmentary view showing the tray and pad in extended operative position.
Figure 4 is a section on the line 4—4 of Figure 3.
Figure 5 is a partial view similar to Figure 4 showing the hooks on the end of the tray engaging the cradle bottom; and, Figure 6 is a section on line 6—6 of Figure 1.

In addition as an added protection, the cradle portion may be coated with a cushioning material such as sponge rubber as shown in Figure 2.

Slidably mounted within the hollow chamber 10 is a tray 18 carrying a memorandum pad or the like 20. As shown in Figures 2 to 5, a depending ear 34 from the top of the hollow chamber provides a stop for the tray at one end of the chamber. A corresponding ear 36 on the tray cooperates with the stop so as to have the tray and pad extend at a convenient angle for writing. The tray is strengthened by side fillets 38 and the pad is held between ear 36 and side fillets 38 by a lip 40 on the opposite end. Two hooks or catches 42 are provided adjacent lip 40 to engage the bottom of chamber 10 and thereby prevent the tray from being accidentally pushed out the open end of the chamber.

While I have shown and described the preferred embodiment of my invention, I wish it understood that I do not confine myself to the specific construction shown and described herein, as it is apparent that various changes and modifications may be made therein by those skilled in the art without departing from the spirit of the invention, or exceeding the scope of the appended claim.

I claim:

An auxiliary telephone cradle apparatus for use with a telephone having a base portion, a hand set cradle on the top thereof having a recess therein, and a hand set adapted to be positioned in said cradle and containing a receiver and transmitter which comprises, a hand set cradle portion having two pairs of upstanding ears mounted at spaced intervals on a thin convex sheet material base portion, a curved resilient tongue portion having the end turned back to thereby adapt it to engage the lip of the recess in said hand set cradle, a resilient U-shaped channel portion connecting said tongue portion to one side of said sheet base portion, a chamber-forming portion of thin sheet material extending from the other side of said sheet base portion and folded back underneath said sheet base portion to form a hollow chamber therebetween, said chamber being adapted to slidably receive therein for movement to and from an extended position a tray carrying a memo pad, and a depending stop portion on one end of said sheet metal base portion to position said tray and pad in proper writing attitude when extended from said chamber.

References Cited in the file of this patent

UNITED STATES PATENTS

| Number | Name | Date |
|---|---|---|
| 1,767,003 | Kaplan | June 24, 1930 |
| 2,320,838 | Watson | June 1, 1943 |
| 2,488,516 | Shore | Nov. 15, 1949 |